Patented July 3, 1945

2,379,684

UNITED STATES PATENT OFFICE 2,379,684

AZO DYESTUFF DERIVATIVES OF AMINO-BENZO-p-DIOXANS

Robert C. Conn and Frederic H. Adams, Bound Brook, and John P. Goulding, Neshanic Station, N. J., assignors to American Cyanamid Company, New York, N. Y., a corporation of Maine No Drawing. Application December 10, 1943, Serial No. 513,737

9 Claims. (Cl. 260—152)

This invention relates to a new series of azo dyestuffs derived from monoamino-benzo-paradioxans, the dyestuffs being obtained by diazotization and coupling of N-substituted derivatives of such aminobenzodioxans as 6-amino-1,4-benzodioxan having the formula

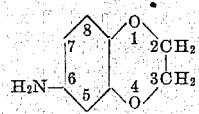

or 7-amino-benzo-para.-dioxeno-para-dioxan having the analogous formula

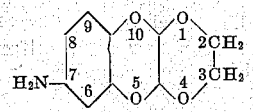

the N-substituent being a para-amino-phenyl radical. The latter may be represented and numbered for the purposes of the present invention as

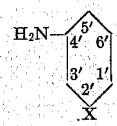

in which X may represent a hydrogen, halogen, carboxy or sulfonic radical, the acyl radical of a carboxylic acid or a sulfonamide group.

The instant application relates to new azo dyestuffs, particularly to ice-colors, which possess novel color shades and unusual light fastness. The N-para-amino-phenyl substituted aminobenzo-para-dioxans per se comprise the subject matter of our copending application for United States Letters Patent, Serial No. 513,734, filed of even date.

Very few aromatic amino compounds have been known which produce on diazotization and coupling with an ice-color coupling component strong blue to violet shades. It is one of the principal objects of the present invention to produce a new series of bases and ice-colors derived therefrom which will have these desirable shades. It is a further object of the invention to produce a series of bases suitable for the production of other azo dyes and to develop such dyes therefrom.

In general, the principal objects of the present invention are accomplished by condensing the amino-benzo-para-dioxan with a para-nitrohalogenobenzene and subsequently reducing the nitro group to an amino group. The resulting new compounds, after diazotization and coupling, yield dyestuffs which have desirable properties.

Either para-nitrohalogenobenzene or a para-nitrohalogenobenzene containing a negative substituent ortho to the halogen radical may be used as a starting material. These negative substituents may include radicals such as halogen, nitro, carboxy, or sulfonic radicals, the acyl radical of a carboxylic acid or a sulfonamide group. In any case, after condensation and reduction the product constitutes an N-para-aminophenyl-substituted aminobenzodioxan. Therefore, as used in the instant application, the expression "a para-aminophenyl radical" includes not only the para-amino-phenyl radical, but also those 2'-substituted 4'-aminophenyl groups in which the negative substituents are present.

Similarly, for the purposes of the present invention, the expression "a sulfonamide radical" is used to designate not only the

group, but also N-substituted-sulfonamides. In the latter case, the sulfonamide group may be one in which either or both of the hydrogens are substituted by an alkyl or aryl radical or one in which the substituents form with the nitrogen a heterocyclic ring such as a sulfonpiperidide, sulfonmorpholide or the like.

Those para-nitrohalogenobenzenes containing negative substituents, ortho to the halogen radical, are particularly useful. When such materials are used, condensation proceeds smoothly in aqueous media. The invention, however, is not necessarily so limited. Condensation may be carried out in any solvent compatible with the solubility and reactivity of the particular nitrohalogenobenzene employed. In some cases, an anhydrous solvent such as nitrobenzene or the like is required. In some cases, also, the use of a cupriferous catalyst may be of advantage. Generally, too, it is well to provide an acid binder such as a metal oxide, carbonate or the like.

Reduction of the nitro to an amino group may be carried out either by alkaline or by acidic reducing agents. The pH will determine whether free bases or salts will be produced. It will be apparent that two different types of salts are possible. There may be acid salts of the base. On the other hand, when an acidic substituent such as a carboxylic or sulfonic group is present on the p-aminophenyl radical, the acidic constituent may be neutralized to form a salt. Both types of salts as well as the free bases are useful. Each may be converted to the other by appropriate treatment. Reference to the new bases in the instant specification and claims is therefore intended to include not only the bases themselves but also both types of salts thereof.

Diazotization of some bases of the present invention in mineral acid solution by nitrous acid produces, according to the conditions imposed, two different products. In general, use of higher temperatures, greater concentration of the base in solution, higher mineral acid concentration and excess nitrous acid generally lead to formation of an N-nitroso derivative of the diazonium salts. Lower temperature, lower acid concentrations and controlled nitrous acid addition lead to formation of the diazonium chloride itself.

In general, the N-nitroso diazotization products lead to the production of different, duller and less desirable shades when coupled. The simple diazotized product leads to the production of the more valuable and faster shades. Conversion of the N-nitroso colors to the more desirable shades is accomplished through hydrolysis of the former. This may be accomplished by heating the N-nitroso derivatives in dilute solutions of some alkaline material such as soda ash or the like. Reducing agents such as sodium sulfide, sodium bisulfite or their equivalents may be included in the saponification bath to destroy nitric oxides as they are liberated.

In their diazotized form, the bases may be coupled either with or without a substrate, to yield dyestuffs or pigments of great value because of their strength, variety of shade and fastness properties. In particular, however, the bases of the present invention are important for the production of fast blue prints or dyeings upon cellulosic materials. These are produced in general, by impregnating the cellulosic material in alkaline baths with appropriate ice-color coupling components and then printing solutions of the diazotized bases which have been buffered and thickened upon such prepared cloth, or by pad dyeing the prepared cloth in buffered solutions of the diazotized bases or of the diazo salts.

The bases of the present invention may be also converted into diazo-sulfonates. If the basic portion of these diazo-sulfonates is free from solubilizing groups, they may be blended with appropriate ice-color coupling components and oxidizing agents. Such blends may be incorporated into a printing paste, printed on vegetable fibers and the pigment developed by treatment with steam.

Substantially any of the ice-color coupling components are generally useful for production of insoluble, developed dyes, and enable the production of a variety of colors from yellow to blue. However, for the present purposes, the use of arylides of 2-hydroxy-3-naphthoic acid is preferable. These produce, when coupled with the diazotized bases of the present invention, the most desirable blue to violet shades.

However, the invention is not necessarily so limited. Among other ice-color coupling components which produce useful products may be listed by way of example such compounds as beta-naphthol, 8-amino-2-naphthol, 8-acetylamino-2-naphthol, benzoyl napthols; pyrazolones and pyrazyl pyrazolones; hydroxy benzofluorenones; hydroxy derivatives of phenyl naphthylamines such as 7-hydroxy-1-naphthyl-m-hydroxyphenylamine; particularly the various N-substituted amides such as arylides of 5,6,7,8-tetrahydro-2-hydroxy-3-naphthoic acid, of 2-hydroxy-3-anthroic acid, of methyl and dimethyl salicyclic acids, of hydroxy carbazole carboxylic acids, of hydroxy benzocarbazole carboxylic acids, of hydroxy-benzoacridone carboxylic acids, of 3,7-dihydroxy-naphthalene-2,6-dicarboxylic acid, of hydroxy-dibenzofuran carboxylic acids, of hydroxy benzothiophene carboxylic acids, etc., and the arylides of acetoacetic acid, furoyl acetic acid, benzoyl acetic acid, terphthaloyl-bis-acetic acid and the like. The arylide group in the coupling component may be a simple aromatic group such as the radical of aniline or of an aniline derivative or of a naphthylamine, or it may be the radical of a heterocyclic amine, such as, e. g., of an amine of the benzothiazole series or of a diamine of the diphenylene oxide or diphenylene sulfone series.

The bases of the present invention also may be used in the preparation of water-soluble dyestuffs suitable for dyeing vegetable or animal fibers. In this case, a great many of the customary phenolic or aminic coupling components may be used. The coupling component, however, must carry at least one sulfonic group in case the diazo component has none. Illustrative examples of such coupling components include salicyclic acid, resorcinol, m-phenylene diamine, the large number of naphthol-sulfonic acids such as e. g., R acid, G acid, the Cleve's acids, J acid, Gamma acid, J-acid urea and J-acid imide, H acid and many others. Pyrazolones such as sulfonic derivatives of 1-phenyl-3-methyl pyrazolone-5 also may be used.

If so desired, the new diazo components of the present invention also may be used for the production of dis- and poly-azo dyes in accordance with the customary procedures. Depending upon their structure, the dyes obtained from the new bases are direct dyes, acid wool dyes or chrome dyes. In each group, a great many of them have very valuable dyeing and fastness properties.

The invention will be more fully illustrated in conjunction with the following examples which are meant to be illustrative only and not by way of limitation. All parts are by weight unless otherwise noted.

*Example 1*

133 parts of sodium 2-chloro-5-nitrobenzene sulfonate (61.8% purity) are condensed with 55.8 parts of 6-amino-1,4-benzodioxan in 400 parts of water in the presence of 50 parts of calcium carbonate by refluxing the mixture until reaction is substantially complete. Then 600 parts of water and 12 parts of ammonium chloride are introduced, and at reflux temperature 80 parts of zinc dust are added in successive small portions. When the reaction mixture has become colorless, it is clarified and 180 parts of hydrochloric acid (1.19) are added. The precipitated product is separated by filtration and washing with water on the filter. It has the formula

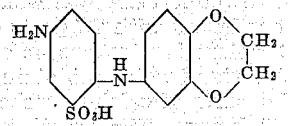

Example 2

20 parts of N-(2'-sulfo-4'-amino phenyl)-6-amino-1,4-benzodioxan obtained in Example 1 are heated at reflux for 7 hours in 300 parts of 25% hydrochloric acid containing 3 parts of stannous chloride. Completion of the reaction is indicated by the fact that no alkali-soluble material remains. To the reaction mixture is added 200 parts of water and the reaction mixture clarified by filtration. The filtrate is neutralized by the addition of caustic, and 10 parts of sodium hydrosulfite are added, and when decolorization is complete, the precipitated product is separated by filtration. The N-(4'-aminophenyl)-6-amino-1-4-benzodioxan when crystallized from benzene melts at 132° C. and has the following formula:

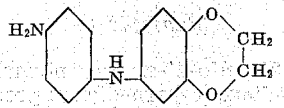

Example 3

0.8 part of the amine of Example 2 is dissolved in 4 parts of alcohol and run at 30° C., into a solution of 9 parts of zinc chloride and 0.3 part of sodium nitrite in 10 parts of water. The precipitated product is filtered and the residue is washed with 20 parts of water. The washings are combined with the first filtrate and sodium chloride is added to complete precipitation. The precipitated zinc chloride double salt is filtered and dried under vacuum.

Example 4

The zinc chloride double salt obtained in Example 3 is mixed with one-third of its weight of magnesium sulfate di-hydrate. 2 parts of this color mixture are dissolved in 25.5 parts of water containing 2 parts of 20% sodium acetate and 0.5 part of 50% acetic acid. 70 parts of a suitable carbohydrate thickener are added. This color paste is printed from an engraved roll on cotton piece goods previously impregnated with the ortho-toluidide of 2-hydroxy-3-naphthoic acid from an alkaline solution, and the printed stripe is passed through a dilute soda ash solution at 35° C., then soaped at the boil and finished by passing through a boiling 5% soda ash solution. A bright blue dyeing results with very good fastness properties.

Example 5

When the alpha-naphthylamide of 2-hydroxy-3-naphthoic acid is substituted for the ortho-toluidide and the procedure of Example 4 is repeated, a blue of greener shade is obtained.

Example 6

1.15 parts of the zinc chloride double salt produced as in Example 3 are dissolved in 40 parts of water and 0.32 part of anhydrous sodium sulfite dissolved in 2½ parts of water added, followed by 0.26 part of sodium carbonate. The reaction mixture is clarified by filtration and 14 parts of sodium chloride added to the filtrate. The precipitated sodium diazo sulfonate is filtered and dried. 3.57 parts of the sodium diazo sulfonate are well mixed with 2.63 parts of 2-hydroxy-3-naphthoic acid anilide. This color mixture is dissolved in water together with sodium chromate and the solution is treated with a suitable thickener. The resultant paste is printed on cotton piece goods from an engraved roll, the printed stripe then being dried and steamed. After soaping and drying the pattern is printed a greenish-blue shade.

Example 7

1.6 parts of N-(2'-sulfo-4'-amino phenyl)-6-amino-1,4-benzo-dioxane as obtained in Example 1 are stirred in 25 parts of water and are dissolved by adding 0.2 part sodium hydroxide. To the clear solution are added 2.5 parts of hydrochloric acid (1.19). The resultant slurry is cooled to 5° C., and diazotized by adding 0.35 part of sodium nitrite dissolved in 5 parts of water. A solution of 1.3 parts of sym.-di-(5,5'-hydroxy-7,7'-sulfo-2,2'-naphthyl) urea dissolved in 60 parts of water containing 3.2 parts of soda ash is made, the temperature lowered to 3° C., and the diazo slurry is run in. An immediate deep blue color results, coupling being complete in about 15 minutes. At 70° C., the dyestuff is salted out by adding 20.0 parts of sodium chloride. After stirring for 15 minutes, the precipitate is filtered off, washed on the filter with 10% salt solution and dried at 45° C. The resultant product is a deep blue-black powder readily soluble in water, yielding a bright blue solution, and has the following formula:

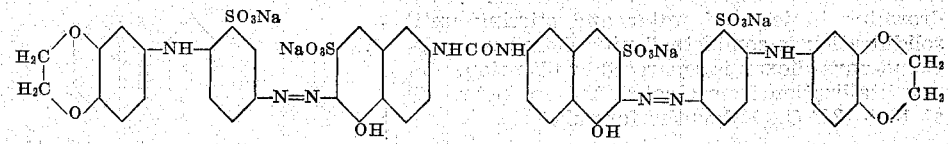

Example 8

0.5 part of the dyestuff as prepared in Example 7 is dissolved in 500 parts of water. One-tenth of this solution is diluted with 150 parts of water and 4.0 parts of sodium chloride dissolved in the solution. 5.0 parts of previously wet-out cotton piece goods are entered into the dye bath. While agitating the cloth, the temperature of the dye bath is raised to and maintained at the boil for one-half hour. At this time, the cloth is removed, rinsed in fresh water, treated at 65° C. in a 1% soap solution, rinsed again and dried. The cotton piece goods is levelly dyed a bright blue of reddish shade.

Example 9

One-tenth part of the standard dye solution as prepared in Example 8 is diluted with 150 parts of water, and then 2.0 parts of sodium sulfate and 2.0 parts of 5% sulfuric acid solution are added. 5.0 parts of well boiled-out wool flannel are entered in this dye bath and while agitating efficiently the temperature is raised to the boil. After boiling for three-quarters of an hour, the cloth is removed, rinsed with fresh water, heated at 65° C. in a 1% soap solution, rinsed in fresh water and dried. The wool flannel is dyed levelly a brilliant corinth.

Example 10

A diazo slurry is prepared as described in Example 7. This is stirred into a cold solution of 0.98 part of acetoacetanilide in 50 parts of water containing 0.23 part of sodium hydroxide and 2.6 parts of soda ash. A tan precipitate forms immediately. When coupling is complete, the temperature is raised to 40° C. and 15.0 parts of sodium chloride added. The brown precipitate is filtered off and is dried at 45° C. A brown powder results which dissolves readily in water, yielding a yellow solution, and has the following formula:

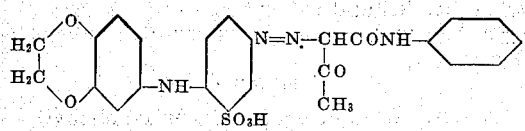

Example 11

0.2 part of the dyestuff prepared in Example 10 is dissolved in 200 parts of water to which is added 2.0 parts of sodium sulfate and 2.0 parts of 5% sulfuric acid. 5.0 parts of wool flannel previously well boiled out are entered and the solution is gently boiled for one-half hour. The cloth is removed, rinsed in fresh water, heated at 65° C. in 1% soap solution, rinsed in fresh water and dried. A strong, golden yellow dyeing results.

Example 12

38.8 parts of benzo-para-dioxeno-para-dioxan are dissolved in 420 parts of glacial acetic acid containing 30 parts of sulfuric acid (1.84) and are nitrated at 30° C. by the addition of 12.6 parts of a mixed acid (28% nitric acid; 56% sulfuric acid). The temperature is maintained at 30°–50° during the addition of the mixed acid and then is held at 50°–60° C. for about 30 minutes. After drowning in ice and water and stirring until solidification is complete, 7-nitro-benzo-para-dioxeno-para-dioxan is separated by filtration. On recrystallization from alcohol, the product melts at 130°–131° C. It has the formula

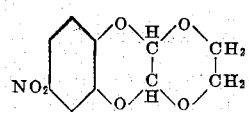

Example 13

33 parts of the nitrobenzo-para-dioxeno-para-dioxan produced in Example 1 are dissolved in 800 parts of water containing 6.5 parts of glacial acetic acid, 70 parts of iron filings added and the mixture stirred at 60° C. for about seven hours. 260 parts of benzene are added at the boiling point and the reaction mixture is cooled to room temperature. After filtration and separation of the benzene layer, the aqueous layer and residue are again extracted with 180 parts of hot benzene. The benzene extracts are dried. Addition of dry hydrogen chloride separates the hydrochloride which is filtered off, dissolved in water, the water solution clarified and the free amine precipitated by neutralizing the solution with soda ash. Crystalized from alcohol, the 7-amino-benzo-para-dioxeno-para-dioxan melts at 95°–96° C. It has the formula

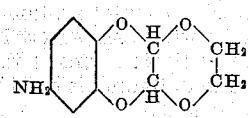

Example 14

5 parts of 7-amino-benzo-para-dioxeno-para-dioxan are condensed with 7.7 parts of the sodium salt of 2-chloro-5-nitrobenzene sulfonic acid (89%) in 80 parts of water containing 2 parts of alcohol and 4 parts of calcium carbonate at the reflux for 48 hours. The reaction mixture is filtered while hot, and 10 parts of ammonium chloride in 150 parts of water are added to the filtrate. The resultant mixture is brought to the boil and 7 parts of zinc dust are strewn in portionwise. When the reaction mixture has become decolorized, it is filtered while hot, the filtrate acidified with acetic acid and the resultant white precipitate separated by filtration. The product, N - (2' - sulfo - 4'-aminophenyl) -7-amino-benzo-para-dioxeno-para-dioxane has the formula

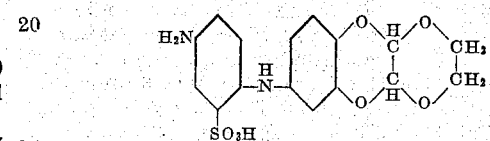

Example 15

The N-(2'-sulfo-4'-amino phenyl)-7-amino-benzo-para-dioxeno-para-dioxan produced in Example 14 is refluxed in 165 parts of 20% hydrochloric acid until solution is complete. The reaction mixture is clarified in the presence of decolorizing charcoal and treated with an excess of caustic. The alkaline solution is extracted with ether and the ethereal solution dried. Addition of dry hydrogen chloride precipitates the N-(4'-aminophenyl) - 7 - amino - benzo - para-dioxeno-para-dioxan hydrochloride. The compound has the following formula:

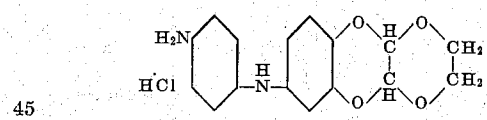

Example 16

The hydrochloride of Example 15 is diazotized in dilute hydrochloric acid solution at room temperature by the addition of sodium nitrite to a permanent test against starch iodide paste. The diazo solution so prepared is buffered to a negative acid test against Congo Red test paper by addition of sodium acetate solution and then sodium carbonate is added until the solution is neutral to litmus. Cotton cloth previously impregnated in an alkaline bath of the anilide of 2-hydroxy-3-naphthoic acid is pad dyed in the buffered diazo bath until color development is complete. The dyed cloth is treated in a dilute soda ash solution at 40° C., boiled in a 5% soda ash solution and finished by soaping at elevated temperature, washing and drying. The cloth is dyed a strong blue.

Example 17

Dyestuffs of distinctive colors valuable because of brightness and general fastness properties are obtained by diazotization of N-(2'-sulfo-4'-aminophenyl) - 6 - amino-1,4-benzodioxan and coupling of the resulting diazo compound with a variety of coupling components. The following list illustrates some of the dyestuffs obtainable and the shades produced in their application:

| Dyestuffs | Color of dye | Acid wool dyeing | Direct cotton dyeing |
|---|---|---|---|
| N-(2'-sulfo-4'-aminophenyl) → 6-amino-1,4-benzodioxan 2-hydroxynaphthalene-3,6-disulfonic acid | Black | Black | |
| N-(2'-sulfo-4'-aminophenyl) → 6-amino-1,4-benzodioxan 2-amino 5-hydroxynaphthalene-7-sulfonic acid | Dark brown | Dark brown | |
| N-(2'-sulfo-4'-aminophenyl) → 6-amino-1,4-benzodioxan 1-(4'-sulfophenyl)-3-methyl pyrazolone-5 | Red-brown | Maroon | |
| N-(2'-sulfo-4'-aminophenyl) → 6-amino-1,4-benzodioxan 5,5'-dihydroxy-2,2'-dinaphthylamine-7,7'-disulfonic acid | Black | Navy | Green-blue |
| N-(2'-sulfo-4'-aminophenyl) I (acid) → 6-amino-1,4-benzodioxan 1-amino-8-hydroxynaphthalene-3,6-disulfonic acid ↑ II aniline (alkaline) | ...do... | Corinth | |
| N-(2'-sulfo-4'-aminophenyl) → 6-amino-1,4-benzodioxan 2-hydroxy benzoic acid | Brown | Khaki (top-chromed) | |
| N-(2'-sulfo-4'-aminophenyl) I → 6-amino-1,4-benzodioxan 1,3-dihydroxy benzene ↑ II (alkaline) Sulfanilic acid | Dark brown | Chocolate | |
| N-(2'-sulfo-4'-aminophenyl) I (acid) → 6-amino-1,4-benzodioxan 1-naphthylamine ↓ (Diazotized) 1-naphthylamine-7-sulfonic acid ↓ (Diazotized) N-phenyl-5-hydroxy-2-naphthylamine-7-sulfonic acid | Black | Brown-black | Blue |

We claim:

1. New azo dyestuffs of the general formula A—N=N—B in which A is the residue of a coupling component and B is the residue of an N-para-amino-phenyl-substituted heterocyclic compound selected from the group consisting of 6-aminobenzo-para-dioxan, and 7-amino-benzo-para-dioxeno-para-dioxan.

2. New azo dyestuffs according to claim 1 in which A is the residue of an ice-color coupling component.

3. New azo dyestuffs according to claim 1 in which A is the residue of an arylide of 2-hydroxy-3-naphthoic acid.

4. New azo dyestuffs of the general formula A—N=N—B in which A is the residue of a coupling component and B is the residue of an N-(4'-amino-2'-sulfo-phenyl) substituted heterocyclic compound selected from the group consisting of 6-amino-benzo-para-dioxan and 7-amino-benzo-para-dioxeno-para dioxan.

5. An azo dyestuff having the formula

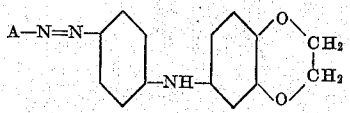

in which A is the residue of an ice-color coupling component.

6. An azo dyestuff according to claim 5 in which A is the residue of an arylide of 2-hydroxy-3-naphthoic acid.

7. An azo dyestuff according to claim 5 in which A is the residue of an arylide of the benzene series of 2-hydroxy-3-naphthoic acid.

8. An azo dyestuff according to claim 5 in which A is the residue of the β-naphthylamide of 2-hydroxy-3-naphthoic acid.

9. An azo dyestuff according to claim 5 in which A is the residue of the orthophenetidide of 2-hydroxy-3-naphthoic acid.

ROBERT C. CONN.
FREDERIC H. ADAMS.
JOHN P. GOULDING.